United States Patent [19]

Yamasoe

[11] Patent Number: 5,009,962
[45] Date of Patent: Apr. 23, 1991

[54] SURFACE TREATMENT CHEMICAL AND BATH FOR FORMING HYDROPHILIC COATINGS AND METHOD OF SURFACE-TREATING ALUMINUM MEMBERS

[75] Inventor: Katsuyoshi Yamasoe, Yotsukaidou, Japan

[73] Assignee: Nippon Paint Co., Ltd., Osaka, Japan

[21] Appl. No.: 538,807

[22] Filed: Jun. 15, 1990

Related U.S. Application Data

[62] Division of Ser. No. 293,290, Jan. 4, 1989, Pat. No. 4,973,359.

[51] Int. Cl.$^5$ .................... B32B 15/04; C23C 22/00
[52] U.S. Cl. .................... 428/470; 106/14.13; 148/265; 165/133; 428/469
[58] Field of Search ............... 428/469, 470; 106/14.13, 14.14; 165/133; 148/265

[56] References Cited

U.S. PATENT DOCUMENTS

| | | | |
|---|---|---|---|
| 3,846,182 | 11/1974 | Huff et al. | 148/265 |
| 4,457,790 | 7/1984 | Lindert et al. | 165/133 |
| 4,503,907 | 3/1985 | Tanaka et al. | 165/133 |
| 4,588,025 | 5/1986 | Imai et al. | 165/133 |

*Primary Examiner*—Thomas J. Herbert
*Attorney, Agent, or Firm*—Sughrue, Mion, Zinn, Macpeak & Seas

[57] ABSTRACT

Hydrophilic coatings on aluminum plates comprising, on a solid basis, 5–25 parts by weight of a sodium salt and/or a potassium salt of carboxymethylcellulose, and 25–50 parts by weight of an ammonium salt of carboxymethylcellulose, and 25–70 parts by weight of N-methylol acrylamide, which may further contain 1.5–15 parts by weight of polyacrylic acid and 0.6–9 parts by weight (as Zr) of a zirconium compound, per 100 parts by weight of the above indispensable components.

4 Claims, No Drawings

SURFACE TREATMENT CHEMICAL AND BATH FOR FORMING HYDROPHILIC COATINGS AND METHOD OF SURFACE-TREATING ALUMINUM MEMBERS

This is a divisional of application Ser. No. 07/293,290 filed Jan. 4, 1989 now U.S. Pat. No. 4,973,359.

BACKGROUND OF THE INVENTION

The present invention relates to an aqueous surface treatment chemical for forming hydrophilic coatings on heat exchanger fins, etc., a bath containing such a surface treatment chemical, a method of surface-treating an aluminum member with such an aqueous surface treatment chemical, and an aluminum member provided with a hydrophilic coating of such a surface treatment chemical. More particularly, it relates to an aqueous surface treatment chemical for forming hydrophilic coatings with good corrosion resistance and highly durable hydrophilic nature and also with no or extremely reduced odor on aluminum fins of heat exchangers, a bath containing such a surface treatment chemical and a method of treating them.

Aluminum and its alloys are light and have good workability and heat conductance, so that they are widely used for fins of heat exchangers. Recently more and more air conditioners have been used not only for cooling but also for warming and dehumidification. In heat exchange parts of these air conditioners, aluminum alloy fins are generally used.

However, it is observed that moisture tends to be condensed and deposited as water droplets on the fin surfaces of air conditioners during cooling operations. If the fin surface is water-repellent, this condensed water tends to be deposited in a hemispherical form on the fin surface or forms bridges between the fins, preventing smooth air flow, which in turn increases resistance of air flow, thereby decreasing heat exchange efficiency.

In addition, although aluminum and its alloys are essentially excellent in corrosion resistance, it is likely that the condensed water remaining on the aluminum fin surfaces for a long period of time functions like an oxygen concentration cell, and that contaminants such as nitrogen oxides $NO_x$ and sulfur oxides in the air are absorbed and concentrated in the condensed water. As a result, a hydration reaction and a corrosion reaction are accelerated. Those produced by the corrosion are accumulated on the aluminum fin surfaces, which not only deteriorate heat exchange performance, but also are blown out of the air conditioners as white fine powders together with a hot air during the warming operation in the winter.

To solve these problems, various attempts have been made to form on aluminum fin surfaces coatings for improving their corrosion resistance and for increasing their hydrophilic nature.

Such coatings are generally classified into inorganic coatings and organic coatings.

Proposed as methods for forming inorganic coatings are methods comprising forming a corrosion-resistant coating, for instance, by a chromate treatment, and dipping it in an aqueous solution mainly composed of boehmite (Japanese Patent Laid-Open No. 56-108071), or silicate to form a hydrophilic coating (Japanese Patent Laid-Open Nos. 56-13078 and 50-38645). However, despite the fact that such inorganic coatings have good corrosion resistance, they are poor in hydrophilic nature. Besides, in the case of a silicate treatment, it generates unpleasant odor peculiar to silica. In addition, when it is used to produce pre-coated coils, the coating is cracked while cutting so that its corrosion resistance is reduced, and also severe tool wear takes place by cutting operation of such precoated aluminum plates.

On the other hand, as a method of forming organic coating, a method of forming a hydrophilic coating on an aluminum surface by applying an aqueous solution comprising a water-soluble or water-dispersible, high-molecular weight resin and silica fine powders to the aluminum surface, and then heat-curing the coating was proposed (for instance, Japanese Patent Laid-Open Nos. 55-99976, 53-125437 and 55-164264). However, since this coating contains fine silica powder, it suffers from cracking while cutting in the case of a pre-coated aluminum plate, leading to lower corrosion resistance. And tools are extremely worn during cutting operations and the coating has relatively poor hydrophilic nature. In addition, it causes air conditioners to release unacceptable if slight odor peculiar to silica. Incidentally, Japanese Patent Laid-Open No. 55-164264 discloses the use of water soluble melamines, alkyds, polyesters, acrylics for the same purpose, but their properties are not sufficient.

Further, U.S. Pat. No. 4,503,907 discloses a heat exchanger coated with an aqueous coating composition comprising a plurality of spaced fins with narrow distance in parallel to form flow passages between fins and a plurality of heat transfer pipes passing through the fins, the both surfaces of the fins being coated with an aqueous coating composition comprising 100 parts by weight of a resin component for water paint in solid content, 5 to 95 parts by weight of a surfactant and 5 to 65 parts by weight of synthetic silica and baked at a temperature of 120° C. to 200° C. for 10 to 40 minutes for curing to give a coating film of 3 to 20 μm, whereby the fins are provided with hydrophilic surfaces having excellent corrosion resistance and surface hardness. However, this coating composition also contains silica which causes the generation of unacceptable odor.

U.S. Pat. No. 4,588,025 discloses a heat exchanger made of aluminum and comprising a tube and fins attached to the tube, the heat exchanger being characterized in that the fins are treated with a coating composition comprising an alkali silicate, a low-molecular weight, organic compound having carbonyl group, and a water-soluble, high-molecular weight organic compound, and are thereafter dried by heating, whereby a hydrophilic coating is formed over the surfaces of the fins. This hydrophilic coating too releases unacceptable odor because of the silicate.

Further, Japanese Patent Laid-Open No. 61-101798 discloses a heat exchanger fin constituted by a thin aluminum plate, which is coated with a first layer made of a water-soluble acrylic resin, and a second layer made of a water-soluble cellulose resin. However, it shows poor water dissolution resistance.

In addition, Japanese Patent Laid-Open No. 62-105629 discloses an aluminum heat exchanger fin coated with a corrosion-resistant layer comprising an organic layer made of a water-soluble acrylic resin or a water-soluble urethane resin or an inorganic layer made of a chromate layer, a boehmite layer or an anodized layer, and a hydrophilic layer formed thereon, which comprises one or more organic compounds selected from water-soluble cellulose resins and polyvinyl alcohol and a curing agent such as melamine resins. However, this hydrophilic coating is also insufficient in hydrophilic nature and water dissolution resistance.

As described above, the conventional surface treatments of heat exchanger fins fail to provide surface coatings having sufficient hydrophilic nature and corrosion resistance and high mechanical strength without generating unacceptable odor.

OBJECT AND SUMMARY OF THE INVENTION

An object of the present invention is, therefore, to provide an aqueous surface treatment chemical for forming a hydrophilic coatings having excellent hydrophilic nature, corrosion resistance, water dissolution resistance and solvent resistance with substantially no odor, on heat exchanger fins, etc.

Another object of the present invention is to provide a surface treatment bath containing such a surface treatment chemical.

A further object of the present invention is to provide a method for forming a hydrophilic coating with such properties or an aluminum member.

A still further object of the present invention is to provide an aqueous surface treatment chemical for forming hydrophilic coating having not only the above properties but also highly improved alkali resistance, so that they can be formed on heat exchanger fins, etc. constituted by pre-coated aluminum plates, which require periodic rinsing with an alkali solution at least once or twice a year.

A still further object of the present invention is to provide a surface treatment bath containing such a surface treatment chemical.

A still further object of the present invention is to provide a method of forming such hydrophilic coatings with improved alkali resistance on an aluminum member.

A still further object of the present invention is to provide an aluminum member provided with a hydrophilic coating having good hydrophilic nature, corrosion resistance, water dissolution resistance, and solvent resistance with substantially no odor.

Thus, the first surface treatment chemical for forming a hydrophilic coating according to the present invention comprises, on a solid basis, 5-25 parts by weight of a sodium salt and/or a potassium salt of carboxymethylcellulose, 25-50 parts by weight of an ammonium salt of carboxymethylcellulose, and 25-70 parts by weight of N-methylol acrylamide.

The second surface treatment chemical for forming a hydrophilic coating according to the present invention comprises, on a solid basis, 5-25 parts by weight of a sodium salt and/or a potassium salt of carboxymethylcellulose, 25-50 parts by weight of an ammonium salt of carboxymethylcellulose, 25-70 parts by weight of N-methylol acrylamide, and further, per 100 parts by weight of (the sodium salt and/or the potassium salt of carboxymethylcellulose + the ammonium salt of carboxymethylcellulose + the N-methylol acrylamide), 1.5-15 parts by weight of polyacrylic acid and 0.6-9 parts by weight (as Zr) of a zirconium compound.

The first method of suface-treating an aluminum member according to the present invention comprises the steps of degreasing the aluminum member, subjecting it to a chemical treatment, and then treating it with the first surface treatment chemical for forming a hydrophilic coating on the aluminum member which comprises 5-25 parts by weight of a sodium salt and/or a potassium salt of a carboxymethylcellulose, 25-50 parts by weight of an ammonium salt of carboxymethylcellulose, and 25-70 parts by weight of N-methylol acrylamide.

The second method of surface-treating an aluminum member according to the present invention comprises the steps of degreasing and then treating it with the second surface treatment chemical comprising, on a solid basis, 5-25 parts by weight of a sodium salt and/or a potassium salt of carboxymethylcellulose, 25-50 parts by weight of an ammonium salt of carboxymethylcellulose, 25-70 parts by weight of N-methylol acrylamide, and further, per 100 parts by weight of (the sodium salt and/or the potassium salt of carboxymethylcellulose + the ammonium salt of carboxymethylcellulose + the N-methylol acrylamide), 1.5-15 parts by weight of polyacrylic acid and 0.6-9 parts by weight (as Zr) of a zirconium compound.

The third method of surface-treating an aluminum member according to the present invention comprises the steps of degreasing it, subjecting it to a chemical treatment, and then treating it with the second surface treatment chemical comprising, on a solid basis, 5-25 parts by weight of a sodium salt and/or a potassium salt of carboxymethylcellulose, 25-50 parts by weight of an ammonium salt of carboxymethylcellulose, 25-70 parts by weight of N-methylol acrylamide, and further, per 100 parts by weight of (the sodium salt and/or the potassium salt of carboxymethylcellulose + the ammonium salt of carboxymethylcellulose + the N-methylol acrylamide), 1.5-15 parts by weight of polyacrylic acid and 0.6-9 parts by weight (as Zr) of a zirconium compound.

Further, according to the present invention, there are provided surface treatment baths having the compositions as described above, and aluminum members provided with hydrophilic coatings having the compositions as described above.

DETAILED DESCRIPTION OF THE INVENTION

Carboxymethylcellulose used as a sodium salt, a potassium salt or an ammonium salt generally has a polymerization degree of 30-800. When its degree of polymerization is less than 30, the resulting salt does not have a sufficient water dissolution resistance, and when it exceeds 800, it has a too high viscosity, leading to poor coating characteristics. The preferred degree of polymerization of the carboxymethylcellulose is 80-500.

The sodium salt and the potassium salt of carboxymethylcellulose serve to provide the coating layer with a hydrophilic nature. To provide this function effectively, the sodium salt and/or the potassium salt of carboxymethylcellulose is 5-25 parts by weight on a solid basis in the surface treatment chemical. When it is less than 5 parts by weight, it fails to give high hydrophilic nature expressed by a contact angle of water, and when it exceeds 25 parts by weight, the problem of unacceptable odor is caused. The preferred amount of the sodium salt and/or the potassium salt of carboxymethylcellulose is 9-16 parts by weight.

The ammonium salt of carboxymethylcellulose has a function to reduce unacceptable odor. To achieve this function effectively, the NH4 salt of carboxymethylcellulose is 25-50 parts by weight on a solid basis in the surface treatment chemical. When it is less than 25 parts by weight, sufficient odor reduction effect cannot be obtained, and when it exceeds 50 parts by weight, the hydrophilic nature of the resulting coating layer decreases. The preferred amount of the $NH_4$ salt of carboxymethylcellulose is 30-45 parts by weight.

A weight ratio of the Na salt and/or the K salt of carboxymethylcellulose to the $NH_4$ salt is 0.1:1-1:1. When the weight ratio of the Na salt and/or the K salt to the $NH_4$ salt is less than 0.1, sufficient hydrophilic nature cannot be obtained, and when it exceeds 1, sufficient odor reduction effect cannot be obtained. The preferred weight ratio of the Na salt and/or the K salt to the $NH_4$ salt is 0.2-0.53.

N-methylol acrylamide has a function to improve adhesion of the resulting hydrophilic coating to an aluminum surface and also to increase coating's water dissolution resistance. The amount of N-methylol acrylamide is 25-70 parts by weight on a solid basis in the surface treatment chemical. When it is less than 25 parts by weight, the resulting coating does not show sufficient adhesion to an aluminum surface and sufficient water dissolution resistance. On the other hand, when it exceeds 70 parts by weight, the hydrophilic nature of the coating decreases. Incidentally, a weight ratio of the Na salt and/or the K salt of carboxymethylcellulose+ the $NH_4$ salt of carboxymethylcellulose to N-methylol acrylamide is 0.43-3.0. When it is less than 0.43, sufficient hydrophilic nature cannot be obtained, and when it exceeds 3.0, the resulting coating has poor adhesion to an aluminum surface and poor water dissolution resistance. The preferred weight ratio is 0.64-1.56.

The surface treatment chemical for forming a hydrophilic coating according to the present invention may contain, in addition to the above indispensable components, surfactants, anti-mold agents, antiseptics, etc.

The surfactants may be nonionic, cationic or anionic, but anionic surfactants are preferable from the viewpoint of durability of hydrophilic nature and the easiness of coating. Anionic surfactants which may be used include sodium alkylbenzene sulfonate, sodium alkyldiphenylether disulfonate, sodium alkylnaphthalene sulfonate, a sodium salt of naphthalenesulfonic acid-formalin condensate, etc. The amount of anionic surfactants added is 1-10 parts by weight. When it is less than 1 part by weight, sufficient effect cannot be obtained by the addition of anionic surfactants, and when it exceeds 10 parts by weight, the water dissolution resistance of the resulting coating decreases.

The anti-mold agents and the antiseptics may be quarternary ammonium salts, nitrogen-containing sulfur compounds, halogen-containing nitrogen sulfide compounds, 1,2-benzisothiazoline-3-on (BIT), organic iodine compounds, benzimidazole compounds, etc. Their amount is preferably 0.15-1.5 parts by weight.

The surface treatment bath for forming a hydrophilic coating on an aluminum member according to the present invention is produced by properly diluting the above surface treatment chemical. Accordingly, percentage of the components in the bath are substantially the same as described above. The concentration of the surface treatment bath is usually adjusted so as to be able to provide a hydrophilic coating of 0.05-0.5 $g/m^2$ on an aluminum plate by dipping, spraying, brushing, etc. In general, the concentration of solid components in the bath may be 10-200 g/l. If some of the components decrease unproportionally, they should be supplemented in order to maintain the percentage of each component at a proper level.

Next, the method of surface treatment according to the present invention will be explained below.

Before forming a coating layer with the surface treatment chemical, a degreasing treatment is usually conducted. The degreasing treatment may be conducted by using such solvents as trichloroethylene, perchloroethylene, gasoline, n-hexane, etc., or alkali solutions of sodium hydroxide, sodium carbonate, sodium silicate, sodium phosphate, etc.

After degreasing, a chemical treatment is conducted to form a corrosion-resistant layer on a degreased aluminum member. The corrosion-resistant layer can be obtained by a chromate treatment. The chromate treatment is conducted with a treatment liquid containing chromic acid and sulfuric acid, nitric acid, fluoric acid, phosphoric acid, etc. and proper additives.

The chromate treatment is catagorized into two groups; a phosphoric chromate treatment using phosphoric acid as an inorganic acid, and a chromium chromate treatment using the other acids. From the viewpoint of corrosion resistance, the latter is better. The chromate treatment can be conducted by immersion in a treatment liquid, or spraying the treatment liquid. However, to fit exchanger's fins having complicated shapes, an immersion method is easier. The corrosion-resistant layer obtained by the chromate treatment has a Cr content of 3-50 $mg/m^2$. When it is less than 3 $mg/m^2$, the layer does not have sufficient corrosion resistance. On the other hand, when it exceeds 50 $mg/m^2$, its reaction with the hydrophilic layer takes place, resulting in the deterioration of its hydrophilic nature. The aluminum member formed with the corrosion-resistant layer is then washed with water. This is preferably done with flowing water for 10-30 seconds or so.

In addition to the above chromate treatment, a chemical treatment can also be conducted by using a zirconium treating agent. The zirconium treating agent may be a mixture of polyacrylic acid and zirconium fluoride, etc. A layer produced by this zirconium treatment agent has a Zr content of 0.1-40 $mg/m^2$. Like the Cr content, when the Zr content is less than 0.1 $mg/m^2$, sufficient corrosion resistance cannot be obtained, and when it exceeds 40 $mg/m^2$, the hydrophilic nature rather decreases. When the zirconium treatment is conducted after the chromate treatment, larger effects can be obtained.

Better corrosion resistance can also be obtained by conducting coating of a phenol resin primer after the degreasing. For this purpose, a resol-type water-soluble phenol resin (prepolymer of phenol and formalin produced in the presence of an alkali catalyst) is preferable, and, for instance, Resitop PL-2761, PL-2717 manufactured by Gun Ei Chemical Industry Co., Ltd. and Tamanol 721, 722 of Arakawa Chemical Inc., etc. may be used. The phenol resin primer may contain a melamine resin as a substitute for a phenol resin. A preferable melamine resin is water-soluble one, to which methyl groups, ethyl groups and/or butyl groups are introduced. The content of the melamine resins is 50 weight % or less to 50-100 weight % of the phenol resin. In addition, to increase the workability, such as bending of the coated aluminum member, and applicability of the surface treatment chemical, acrylic resins, etc. may be added.

The phenol resin primer layer is heated at 180°-280° C. for 10 seconds - 1 minute after application. The resulting primer layer is preferably 0.5-2 $g/m^2$. When it is less than 0.5 $g/m^2$, it does not have sufficient corrosion resistance, and when it exceeds 2 $g/m^2$, not only heat exchange efficiency decreases, but also the production cost becomes high.

The surface treatment chemical of the present invention is diluted properly as a bath, and applied to the aluminum surface subjected to degreasing and then to the above chemical treatment. This can be done by a roll-coating method, a bar-coating method, an immersion method, a spraying method, a brushing method, etc. For instance, in the case of a roll-coating method, the hydrophilic coating can be obtained by drying at 150°–240° C. for 10 seconds - 1 minute after application. The resulting hydrophilic coating is 0.05–0.5 g/m$^2$. When it is less than 0.05 g/m$^2$, it does not have sufficient hydrophilic nature, and when it exceeds 0.5 g/m$^2$, the production cost becomes high without providing the correspondingly increased effects.

Another surface treatment chemical according to the present invention comprises, on a solid basis, 5–25 parts by weight of a sodium salt and/or a potassium salt of carboxymethylcellulose, 25–50 parts by weight of an ammonium salt of carboxymethylcellulose, 25–70 parts by weight of N-methylol acrylamide, and further, per 100 parts by weight of a total of the above components, 1.5–15 parts by weight of polyacrylic acid and 0.6–9 parts by weight (as Zr) of a zirconium compound.

The sodium salt and/or the potassium salt of carboxymethylcellulose, the ammonium salt of carboxymethylcellulose, and N-methylol acrylamide may be the same as described above.

Polyacrylic acid contributes to increase the alkali resistance and the corrosion resistance of the resulting hydrophilic coating. The content of the polyacrylic acid is 1.5–15 parts by weight per 100 parts by weight of the sodium salt and/or the potassium salt of carboxymethylcellulose + the ammonium salt of carboxymethylcellulose + N-methylol acrylamide. When it is less than 1.5 parts by weight, sufficient effect of increasing the corrosion resistance cannot be achieved. When it exceeds 15 parts by weight, the hydrophilic nature decreases. The preferred content of the polyacrylic acid is 2–8 parts by weight. Incidentally, in the present invention, the polyacrylic acid is not restricted to that having a repeating structure unit represented by the formula: [CH$_2$CH-COOH]$_n$, but it may include any polyacrylic acid having substituents such as methyl groups, etc.

As zirconium compounds, one or more water-soluble oxides, halides, oxyacid salts, organic acid salts or complex salts which are stable in the treatment solution, may be used alone or in combination. Specifically, they are oxides or their related compounds, such as ZrO$_2$, ZrO$_2$.xH$_2$O, H$_3$ZrO$_3$ or M$_2$ZrO$_3$ (zirconium acid or its salt), ZrO$_3$.2H$_2$O, K$_4$ZrO$_4$.2H$_2$O$_2$.2H$_2$O (peroxozirconium acid or its salt), etc.; halides such as ZrCl$_2$, ZrBr$_2$, ZrI$_2$, ZrCl$_3$, ZrBr$_3$, ZrI$_3$, ZrF$_4$, ZrCl$_4$, ZrBr$_4$, ZrI$_4$, BrOCl$_2$.8H$_2$O, Zr$_2$O$_3$Cl$_2$, etc.; oxyacid salts such as Zr(NO$_3$)$_4$.5H$_2$O, ZrO(NO$_3$)$_2$.2H$_2$O, Zr(SO$_4$)$_2$, Zr(SO$_4$) 2.4H$_2$O, ZrO(So$_4$), ZrO(H$_2$PO$_4$)$_2$, ZrP$_2$O$_7$, ZrSiO$_4$, ZrCO$_4$.ZrO$_2$.8H$_2$O (basic zirconium carbonate); organic acid salts such as Zr(CH$_3$CO$_2$)$_4$, ZrO(CH$_3$CO$_2$)$_2$, etc.; and acids or their complex salts such as H$_2$ZrF$_6$ or M$_2$ZrF$_6$ (hexafluorozirconium(IV) acid or its salt), H$_4$ZrF$_8$ or M$_4$ZrF$_8$ (octafluorozirconium (IV) acid or its salt), H$_4$[Zr(C$_2$O$_4$)$_4$]or M$_4$[Zr(C$_2$O$_4$)$_4$] (tetraoxalatozirconium (IV) acid or its salt), (C$_5$H$_5$)$_2$ZrBr$_2$, etc. Incidentally, in the above formulae, M represents an alkali metal. Particularly preferred zirconium compounds are acids or their complex salts such as hexafluorozirconium acid or its salt, octafluorozirconium acid or its salt, tetraoxalatozirconium acid or its salt, oxyacid salts such as basic zirconium carbonate, zirconium nitrate, zirconium sulfate, etc.

The content of the zirconium compound as Zr is 0.6–9 parts by weight per 100 parts by weight of (the sodium and/or the potassium salt of carboxymethylcellulose + the ammonium salt of carboxymethylcellulose + N-methylol acrylamide). When it is less than 0.6 parts by weight, sufficient effects of increasing alkali resistance and corrosion resistance cannot be achieved, and when it exceeds 9 parts by weight, the viscosity of the treatment solution increases, making the coating operation difficult. The preferred amount of the zirconium compound is 1–5 parts by weight.

The polyacrylic acid and the zirconium compound provide a synergistic effect, so that the addition of both compounds in proper proportions provides an unexpectedly large effects. In general, a weight ratio of polyacrylic acid/Zr in the zirconium compound is preferably 0.17–25. In this range, sufficient effect of increasing corrosion resistance and alkali resistance can be achieved. The preferred weight ratio of polyacrylic acid/Zr in the zirconium compound is 0.4–8.

In this surface treatment chemical, surfactants, anti-mold agents, antiseptics, fluoric acid, etc. may be added in addition to the above indispensable components. With respect to the surfactants, the anti-mold agents and the antiseptics, the same materials as described above may be used.

Fluoric acid has a function to increase the film-forming properties, corrosion resistance, and alkali resistance of the resulting coating layer when the surface treatment chemical is directly applied to an aluminum surface without forming a corrosion-resistant layer after degreasing. The amount of fluoric acid is 2.5–100 ppm in a treatment solution having such a concentration as to provide a hydrophilic coating of 0.05–0.5 g/m$^2$ on a dry basis. When it is less than 2.5 ppm, sufficient effect cannot be obtained, and when it exceeds 100 ppm, correspondingly increased effects cannot be obtained.

This surface treatment chemical may be diluted similarly to provide a surface treatment bath, which may be applied to an aluminum member essentially in the same manner as described above except that the formation of corrosion-resistant layer is not necessary.

Briefly speaking, after degreasing, an aluminum member is directly coated with this surface treatment chemical. However, when high corrosion resistance and alkali resistance are required, a chemical treatment may be conducted after degreasing to form a corrosion-resistant layer. This corrosion-resistant layer can be obtained similarly by a chromate treatment. Further, after degreasing, a primer of a phenol resin, an epoxy resin, etc. may be applied to further increase the corrosion resistance.

The application of this surface treatment chemical to the degreased aluminum surface which may be coated with a corrosion-resistant layer, if necessary, can be conducted in the same manner as described above.

The present invention will be explained in further detail by means of the following Examples.

EXAMPLES 1–5

Each of aluminum plates is degreased and then coated with a zirconium surface treatment agent (Alodine 1690/1691, manufactured by Nippon Paint Co., Ltd.) by a bar coating method, and then dried at 150° C.

for 15 seconds to form a corrosion-resistant coating having 5 mg/m² of Zr content.

Each of the coated aluminum plates is then coated with an aqueous surface treatment solution containing a sodium salt and an ammonium salt of carboxymethylcellulose and N-methylol acrylamide in the composition shown in Table 1 by a bar coating method, and then dried at 240° C. for 30 seconds to form a hydrophilic coating. Each hydrophilic coating is 0.2 g/m². Incidentally, the above hydrophilic surface treatment solution contains 5 parts by weight of sodium alkyldiphenylether disulfonate as a surfactant, and 0.25 parts by weight of a benzimidazole compound and 0.25 parts by weight of a nitrogen-containing sulfur compound both as anti-mold agents, per 100 parts by weight of the above indispensable components.

Each of the resulting hydrophilic coatings is tested with respect to odor, water dissolution resistance, contact angle of water (durability of hydrophilic nature) and corrosion resistance. The test procedures and the evaluation standards of test results are as follows:

(1) Odor test

Each aluminum plate formed with a hydrophilic coating (hereinafter referred to simply as "sample") is tested with respect to odor by directly smelling. The odor is classified as follows:
Excel.: No odor at all
Good: Only slight odor
Fair: Medium odor
Poor: Strong odor (2) Water dissolution resistance Each sample is dipped in running water for 24 hours, and the weight of the coating is measured before and after dipping to determine a water dissolution ratio by the following equation:

$$\text{Water dissolution ratio (\%)} = [(\text{initial coating weight} - \text{coating weight after 24-hour dipping}) \div \text{initial coating weight}] \times 100$$

The evaluation standards of water dissolution resistance are as follows:
Excel.: less than 10%;
Good: 10% or more and less than 30%;
Fair: 30% or more and less than 50%;
Poor: 50% or more.

(3) Test of contact angle of water (Test of durability of hydrophilic nature)

Each sample is subjected to five cycles of treatments, each of which consists of keeping it in contact with running water (5 l/hr) for 17 hours and drying it at 80° C. for 7 hours. After that, 5 μl of deionized water is dropped onto a flat surface of each sample held horizontally to measure a contact angle Q of a water droplet by a goniometer. The contact angle Q is classified into the following categories:
Excel.: $Q < 20°$
Good: $20° \leq Q < 30°$
Fair: $30° \leq Q < 40°$
Poor: $40° \leq Q$ (4) Corrosion resistance test (Salt Spray Test: SST)

According to JIS Z 2371, each sample is sprayed with a sodium chloride aqueous solution for 500 hours to measure the coating's resistance to salt water. The corrosion resistance is evaluated by a ratio of white rust area. The evaluation is conducted by the following standards:

Ratio of white rust area

Excel.: 0%;
Good: More than 0% and less than 10%;
Fair: 10% or more and less than 50%:
Poor: 50% or more.

The test results are shown in Table 1.

EXAMPLE 6

A hydrophilic coating is formed under the same conditions as in Example 1 except for changing the Zr content of the zirconium coating by Alodine 1690/1691 to 0.1 mg/m², and using a hydrophilic surface treatment solution having the composition as shown in Table 1. The same tests are carried out. The results are shown in Table 1.

EXAMPLE 7

Example 6 is repeated except for changing the Zr content of the zirconium coating by Alodine 1690/1691 to 40 mg/m² to form a hydrophilic coating, and the same tests are carried out. The results are shown in Table 1.

EXAMPLES 8–10

A Zr corrosion-resistant coating having a Zr content of 2 mg/m² is formed by Alodine 2 1690/1691 as in Example 6, and a corrosion-resistant chromate coating having a Cr content of 3 mg/m² (Example 8), 20 mg/m² (Example 9) and 50 mg/m² (Example 10), respectively is then formed by conducting a phosphoric chromate treatment with Alodine 407/47 (manufactured by Nippon Paint Co., Ltd.). Formed thereon is a hydrophilic coating by a hydrophilic surface treatment solution having the composition shown in Table 1. The test results are shown in Table 1.

EXAMPLES 11–13

Examples 8–10 are repeated except for forming a chromate coating having a Cr content of 3 mg/m² (Example 11), 20 mg/m² (Example 12) and 50 mg/m² (Example 13), respectively by Alodine 407/47 without forming a Zr corrosion-resistant coating by Alodine 1690/1691. Formed thereon is a hydrophilic coating having the same composition as in Example 6. The test results are shown in Table 1.

EXAMPLES 14–16

A corrosion-resistant coating and a hydrophilic coating are formed as in Examples 11–13 except for using Alodine 600 as a chromium chromate chemical treatment agent in place of Alodine 407/47 to form a chromate coating having a Cr content of 3 mg/m² (Example 14), 20 mg/m² (Example 15) and 50 mg/m² (Example 16), respectively. The test results are shown in Table 1.

EXAMPLES 17 AND 18

A primer layer of 0.5 g/m² (Example 17) and 2.0 g/m² (Example 18), respectively is formed by using NP Alcoat 450 (manufactured by Nippon Paint Co., Ltd.) as a phenol resin primer paint and baked. A hydrophilic coating of 0.2 g/m² is then formed on each primer layer by a hydrophilic surface treatment solution having the same composition as in Example 6. The resulting hydrophilic coatings are tested as above, and the results are shown in Table 1.

Contact angle of water: Excellent
Corrosion resistance: Good

TABLE 1

| Example No. | Composition (Parts by Weight) | | | | |
|---|---|---|---|---|---|
| | CMC-Na[1] | CMC-NH$_4$[2] | N-MAM[3] | CMC[4]/N-MAM | CMC-Na/CMC-NH$_4$ |
| 1 | 5 | 25 | 70 | 0.43 | 0.2 |
| 2 | 12.5 | 37.5 | 50 | 1.0 | 0.33 |
| 3 | 25 | 50 | 25 | 3.0 | 0.5 |
| 4 | 5 | 50 | 45 | 1.22 | 0.1 |
| 5 | 25 | 25 | 50 | 1.0 | 1.0 |
| 6 | 12.5 | 37.5 | 50 | 1.0 | 0.33 |
| 7 | 12.5 | 37.5 | 50 | 1.0 | 0.33 |
| 8 | 12.5 | 37.5 | 50 | 1.0 | 0.33 |
| 9 | 12.5 | 37.5 | 50 | 1.0 | 0.33 |
| 10 | 12.5 | 37.5 | 50 | 1.0 | 0.33 |
| 11 | 12.5 | 37.5 | 50 | 1.0 | 0.33 |
| 12 | 12.5 | 37.5 | 50 | 1.0 | 0.33 |
| 13 | 12.5 | 37.5 | 50 | 1.0 | 0.33 |
| 14 | 12.5 | 37.5 | 50 | 1.0 | 0.33 |
| 15 | 12.5 | 37.5 | 50 | 1.0 | 0.33 |
| 16 | 12.5 | 37.5 | 50 | 1.0 | 0.33 |
| 17 | 12.5 | 37.5 | 50 | 1.0 | 0.33 |
| 18 | 12.5 | 37.5 | 50 | 1.0 | 0.33 |

| Example No. | Properties | | | |
|---|---|---|---|---|
| | Odor | Water Dissolution Resistance | Contact Angle of Water | Corrosion Resistance (SST) |
| 1 | excel. | excel. | good | good |
| 2 | excel. | excel. | excel. | good |
| 3 | excel. | good | excel. | good |
| 4 | excel. | excel. | good | good |
| 5 | good | excel. | excel. | good |
| 6 | excel. | excel. | excel. | good |
| 7 | excel. | excel. | good | good |
| 8 | excel. | excel. | excel. | excel. |
| 9 | excel. | excel. | excel. | excel. |
| 10 | excel. | excel. | good | excel. |
| 11 | excel | excel. | excel. | good |
| 12 | excel. | excel. | excel. | good |
| 13 | excel. | excel. | good | good |
| 14 | excel. | excel. | excel. | good |
| 15 | excel. | excel. | excel. | good |
| 16 | excel. | excel. | good | good |
| 17 | excel. | excel. | excel. | excel. |
| 18 | excel. | excel. | excel. | excel. |

Note
[1] Sodium salt of carboxymethylcellulose (APP84 manufactured by Sanyo-Kokusaku Pulp Co., Ltd.)
[2] Ammonium salt of carboxymethylcellulose (DN-10L manufactured by Daicel Chemical Industries, Ltd.)
[3] N-methylol acrylamide (N-MAM P manufactured by Soken Chemical & Engineering Co., Ltd.)
[4] Total of sodium salt and ammonium salt of carboxymethylcellulose

EXAMPLES 19

A hydrophilic coating is formed in the same manner as in Example 2 except for using a potassium salt of carboxymethylcellulose instead of its sodium salt. The resulting hydrophilic coating is subjected to the same tests. The following results are obtained.
Odor: Excellent
Water dissolution resistance: Excellent

COMPARATIVE EXAMPLES 1-8

Each of degreased aluminum plates is provided with a corrosion-resistant zirconium coating (Zr content: 5 mg/m$^2$) by Alodine 1690/1691, and a hydrophilic coating is formed thereon by a hydrophilic surface treatment solution having the composition shown in Table 2. The hydrophilic coating of each sample is tested in the same manner as in Example 1. The results are shown in Table 2.

TABLE 2

| Comparative Example No. | Composition (Parts by weight) | | | | |
|---|---|---|---|---|---|
| | CMC-Na[1] | CMC-NH$_4$[2] | N-MAM[3] | CMC[4]/N-MAM | CMC—Na/CMC-NH$_4$ |
| 1 | 3 | 50 | 47 | 1.13 | 0.06 |
| 2 | 3 | 22 | 75 | 0.33 | 0.14 |
| 3 | 30 | 50 | 20 | 4.0 | 0.6 |
| 4 | 30 | 0 | 70 | 0.43 | — |
| 5 | 10 | 20 | 70 | 0.43 | 0.5 |
| 6 | 5 | 60 | 35 | 1.86 | 0.08 |
| 7 | 25 | 55 | 20 | 4.0 | 0.45 |
| 8 | 20 | 0 | 80 | 0.25 | — |

Properties
Comparative Water

TABLE 2-continued

| Example No. | Odor | Dissolution Resistance | Contact Angle of Water | Corrosion Resistance (SST) |
|---|---|---|---|---|
| 1 | excel. | excel. | fair | good |
| 2 | fair | excel. | fair | good |
| 3 | fair | fair | excel. | good |
| 4 | poor | excel. | excel. | good |
| 5 | fair | excel. | good | good |
| 6 | excel. | excel. | fair | good |
| 7 | excel. | fair | fair | good |
| 8 | poor | excel. | poor | good |

Note
(1)-(4) Same as in Table 1.

EXAMPLES 20-29

Each of degreased aluminum plates is coated with an aqueous surface treatment solution containing a sodium salt and an ammonium salt of carboxymethylcellulose, N-methylol acrylamide, polyacrylic acid and a zirconium compound in the composition shown in Table 3 by a bar coating method, and then dried at 240° C. for 30 seconds to form a hydrophilic coating. Each hydrophilic coating is 0.2 g/m². Incidentally, the above hydrophilic surface treatment solution contains 5 parts by weight of sodium alkyldiphenylether disulfonate as a surfactant, 0.25 parts by weight of a benzimidazole compound and 0.25 parts by weight of a nitrogen-containing sulfur compound both as anti-mold agents, per 100 parts by weight of the above indispensable components. This solution's concentration is adjusted such that the resulting dried coating has a weight of 0.2 g/m². In this concentration, this solution further contains 25 ppm of fluoric acid.

Each of the resulting hydrophilic coatings is tested with respect to odor, water dissolution resistance, contact angle of water (durability of hydrophilic nature), corrosion resistance and alkali resistance. With respect to odor, water dissolution resistance, contact angle of water and corrosion resistance, the same test procedures as above are conducted, and the same evaluation standards are employed.

(5) Alkali resistance test

Each sample is immersed in Ridoline 53 (manufactured by Nippon Paint Co., Ltd.) as an alkali detergent solution under the conditions as described below. After washing it with running water for 10 seconds, the hydrophilic coating is observed and compared with that before immersion.

Immersion conditions

Concentration of Ridoline 53: 3.0 weight %
Immersion temperature: 70° C
Immersion time: 3 minutes.
The evaluation standards of coating appearance are as follows:
Excel.: Not swelled at all
Good: Slightly swelled
Fair: Swelled
Poor: Partially peeled
The results are shown in Table 3.

EXAMPLE 30

A hydrophilic coating is formed in the same manner as in Example 20 except for using a potassium salt of carboxymethylcellulose instead of its sodium salt. The resulting hydrophilic coating is subjected to the same tests. The results are shown in Table 3.

EXAMPLE 31

A hydrophilic coating is formed in the same manner as in Example 20 except for using $(NH_4)_3ZrOH(CO_3)_3.2H_2O$ instead of $H_2ZrF_6$. The resulting hydrophilic coating is similarly tested. The results are shown in Table 3.

EXAMPLES 32-36

Each of aluminum plates degreased in the same manner as in Example 20 is provided with a phosphoric chromate coating having a Cr content of 3 mg/m², 20 mg/m² and 50 mg/m², respectively with Alodine 407/47 (manufactured by Nippon Paint Co., Ltd.). Formed thereon is a hydrophilic coating by a hydrophilic surface treatment solution having the composition shown in Table 3. The test results are shown in Table 3.

EXAMPLES 37-41

A chromate coating having a Cr content of 3 mg/m², 20 mg/m² and 50 mg/m², respectively is formed in the same manner as in Examples 32-36 except for using Alodine 600 as a chromium chromate chemical treatment agent instead of Alodine 407/47, and a hydrophilic coating having the same composition as in Examples 32-36 is formed thereon. The test results are shown in Table 3.

EXAMPLES 42-45

Each of aluminum plates degreased in the same manner as in Example 20 is coated with NP Alcoat 450 (manufactured by Nippon Paint Co., Ltd.) as a phenol resin primer paint, and baked to form a primer layer of 0.5 g/m² and 2.0 g/m², respectively. Next, a hydrophilic coating of 0.2 g/m² is formed with a hydrophilic surface treatment solution having the composition as shown in Table 3. The results are shown in Table 3.

TABLE 3

Composition of Hydrophilic Coating (Parts by Weight)

| Example No. | Undercoat Type | Undercoat Weight (mg/m²) | CMC-Na(1) | CMC-Ka(2) | CMC-NH₄(3) | N-MAM(4) | CMC-Na or Ka/ CMC-NH₄ | CMC(5)/ N-MAM | PAA(6) | Zr Compound (as Zr) A(7) | Zr Compound (as Zr) B(8) | PAA/ Zr |
|---|---|---|---|---|---|---|---|---|---|---|---|---|

TABLE 3-continued

| | | | | | | | | | | | |
|---|---|---|---|---|---|---|---|---|---|---|---|
| 20 | Only Degreasing | — | 12.5 | — | 37.5 | 50 | 0.33 | 1.0 | 3.75 | 2.2 | — | 1.7 |
| 21 | Only Degreasing | — | 12.5 | — | 37.5 | 50 | 0.33 | 1.0 | 1.5 | 8.8 | — | 0.17 |
| 22 | Only Degreasing | — | 12.5 | — | 37.5 | 50 | 0.33 | 1.0 | 15 | 0.88 | — | 17 |
| 23 | Only Degreasing | — | 12.5 | — | 37.5 | 50 | 0.33 | 1.0 | 1.5 | 0.88 | — | 1.7 |
| 24 | Only Degreasing | — | 12.5 | — | 37.5 | 50 | 0.33 | 1.0 | 15 | 8.8 | — | 1.7 |
| 25 | Only Degreasing | — | 5 | — | 25 | 70 | 0.2 | 0.43 | 15 | 0.88 | — | 17 |
| 26 | Only Degreasing | — | 5 | — | 25 | 70 | 0.2 | 0.43 | 15 | 8.8 | — | 1.7 |
| 27 | Only Degreasing | — | 25 | — | 50 | 25 | 0.5 | 3.0 | 1.5 | 0.88 | — | 1.7 |
| 28 | Only Degreasing | — | 5 | — | 50 | 45 | 0.1 | 1.22 | 15 | 0.88 | — | 17 |
| 29 | Only Degreasing | — | 25 | — | 25 | 50 | 1.0 | 1.0 | 3.75 | 2.2 | — | 1.7 |
| 30 | Only Degreasing | — | — | 12.5 | 37.5 | 50 | 0.33 | 1.0 | 3.75 | 2.2 | — | 1.7 |
| 31 | Only Degreasing | — | 12.5 | — | 37.5 | 50 | 0.33 | 1.0 | 3.75 | — | 2.2 | 1.7 |
| 32 | Phosphoric Chromate Alodine 407/47 | 3 | 12.5 | — | 37.5 | 50 | 0.33 | 1.0 | 3.75 | 2.2 | — | 1.7 |
| 33 | Phosphoric Chromate Alodine 407/47 | 20 | 12.5 | — | 37.5 | 50 | 0.33 | 1.0 | 3.75 | 2.2 | — | 1.7 |
| 34 | Phosphoric Chromate Alodine 407/47 | 50 | 12.5 | — | 37.5 | 50 | 0.33 | 1.0 | 3.75 | 2.2 | — | 1.7 |
| 35 | Phosphoric Chromate Alodine 407/47 | 20 | — | 12.5 | 37.5 | 50 | 0.33 | 1.0 | 3.75 | 2.2 | — | 1 |
| 36 | Phosphoric Chromate Alodine 407/47 | 20 | 12.5 | — | 37.5 | 50 | 0.33 | 1.0 | 3.75 | — | 2.2 | 1.7 |
| 37 | Chromium Chromate Alodine 600 | 3 | 12.5 | — | 37.5 | 50 | 0.33 | 1.0 | 3.75 | 2.2 | — | 1 |
| 38 | Chromium Chromate Alodine 600 | 20 | 12.5 | — | 37.5 | 50 | 0.33 | 1.0 | 3.75 | 2.2 | — | 1.7 |
| 39 | Chromium Chromate Alodine 600 | 50 | 12.5 | — | 37.5 | 50 | 0.33 | 1.0 | 3.75 | 2.2 | — | 1.7 |
| 40 | Chromium Chromate Alodine 600 | 20 | — | 12.5 | 37.5 | 50 | 0.33 | 1.0 | 3.75 | 2.2 | — | 1.7 |
| 41 | Chromium Chromate Alodine 600 | 20 | 12.5 | — | 37.5 | 50 | 0.33 | 1.0 | 3.75 | — | 2.2 | 1.7 |
| 42 | Phenol resin Primer Alcoat 450 | 500 | 12.5 | — | 37.5 | 50 | 0.33 | 1.0 | 3.75 | 2.2 | — | 1.7 |
| 43 | Phenol resin Primer Alcoat 450 | 2000 | 12.5 | — | 37.5 | 50 | 0.33 | 1.0 | 3.75 | 2.2 | — | 1.7 |
| 44 | Phenol resin Primer Alcoat 450 | 500 | — | 12.5 | 37.5 | 50 | 0.33 | 1.0 | 3.75 | 2.2 | — | 1.7 |
| 45 | Phenol resin Primer Alcoat 450 | 500 | 12.5 | — | 37.5 | 50 | 0.33 | 1.0 | 3.75 | — | 2.2 | 1.7 |

| | Properties | | | | |
|---|---|---|---|---|---|
| Example No. | Odor | Water Dissolution Resistance | Contact Angle of Water | Corrosion Resistance (SST) | Alkali Resistance |
| 20 | excel. | excel. | excel. | good | excel. |
| 21 | excel. | excel. | excel. | good | good |
| 22 | excel. | excel. | good | good | good |
| 23 | excel. | excel. | excel. | good | good |
| 24 | excel. | excel. | good | good | excel. |
| 25 | good | excel. | good | good | good |

TABLE 3-continued

| | | | | | |
|---|---|---|---|---|---|
| 26 | good | excel. | good | good | excel. |
| 27 | good | good | good | good | good |
| 28 | excel. | excel. | good | good | good |
| 29 | good | excel. | excel. | good | excel. |
| 30 | excel. | excel. | excel. | good | excel. |
| 31 | excel. | excel. | excel. | good | excel. |
| 32 | excel. | excel. | excel. | good | excel. |
| 33 | excel. | excel. | excel. | excel. | excel. |
| 34 | excel. | excel. | good | excel. | excel. |
| 35 | excel. | excel. | excel. | excel. | excel. |
| 36 | excel. | excel. | excel. | excel. | excel. |
| 37 | excel. | excel. | excel. | good | excel. |
| 38 | excel. | excel. | excel. | excel. | excel. |
| 39 | excel. | excel. | good | excel. | excel. |
| 40 | excel. | excel. | excel. | excel. | excel. |
| 41 | excel. | excel. | excel. | excel. | excel. |
| 42 | excel. | excel. | excel. | excel. | excel. |
| 43 | excel. | excel. | excel. | excel. | excel. |
| 44 | excel. | excel. | excel. | excel. | excel. |
| 45 | excel. | excel. | excel. | excel. | excel. |

Note
[1] Sodium salt of carboxymethlycellulose (APP84 manufactured by Sanyo-Kokusaku Pulp Co., Ltd.)
[2] Potassium salt of caarboxymethylcellulose (acid-type CMC neutralized with KOH to show pH 6, manufactured by Daicel Chemical Industries, Ltd.)
[3] Ammonium salt of carboxymethylcellulose (DN-10L, manufactured by Daicel Chemical Industries, Ltd.)
[4] N-methylol acrylamide (N-MAM P, manufactured by Soken Chemical & Engineering Co., Ltd.)
[5] Total of sodium or potassium salt and ammonium salt of carboxymethylcellulose
[6] Polyacrylic acid (AC-10L, manufactured by Nihon Junyaku Co., Ltd.)
[7] $H_2ZrF_6$ (manufactured by Morita Kagaku Kogyo Co., Ltd.)
[8] $(NH_4)_3ZrOH(CO_3)_3 \cdot 2H_2O$

COMPARATIVE EXAMPLES 9-14

Each of aluminum plates degreased in the same manner as in Example 20 is provided with a hydrophilic coating with a hydrophilic surface treatment solution having the composition as shown in Table 4. The hydrophilic coating of each sample is subjected to the same tests as in Example 20. The results are shown in Table 4.

As described above, the hydrophilic coating formed by the surface treatment chemical according to the present invention has not only good hydrophilic nature, water dissolution resistance and corrosion resistance, but also extremely reduced odor. In addition, it is excellent in alkali resistance when containing both of polyacrylic acid and a zirconium compound. Therefore, it is highly suitable for a hydrophilic treatment of aluminum fins of heat exchangers, etc.

TABLE 4

| Comparative Example No. | Undercoat | | Composition of Hydrophilic Coating (Parts by Weight) | | | | | | | |
|---|---|---|---|---|---|---|---|---|---|---|
| | Type | Weight (mg/m²) | CMC-Na[1] | CMC-NH$_4$[2] | N-MAM[3] | CMC-Na/CMC-NH$_4$ | CMC[4]/N-MAM | PAA[5] | $H_2ZrF_6$[6] (as Zr) | PAA/Zr |
| 9 | Only Degreasing | — | 12.5 | 37.5 | 50 | 0.33 | 1.0 | 3.75 | 0 | — |
| 10 | Only Degreasing | — | 12.5 | 37.5 | 50 | 0.33 | 1.0 | 0 | 2.2 | — |
| 11 | Only Degreasing | — | 12.5 | 37.5 | 50 | 0.33 | 1.0 | 1.0 | 8.8 | 0.11 |
| 12 | Only Degreasing | — | 12.5 | 37.5 | 50 | 0.33 | 1.0 | 15 | 0.44 | 34 |
| 13 | Only Degreasing | — | 12.5 | 37.5 | 50 | 0.33 | 1.0 | 1.5 | 11.0 | 0.14 |
| 14 | Only Degreasing | — | 12.5 | 37.5 | 50 | 0.33 | 1.0 | 20 | 0.88 | 22.7 |

| Comparative Example No. | Properties | | | | |
|---|---|---|---|---|---|
| | Odor | Water Dissolution Resistance | Contact Angle of Water | Corrosion Resistance (SST) | Alkali Resistance |
| 9 | excel. | excel. | excel. | fair | fair |
| 10 | excel. | excel. | excel. | poor | excel. |
| 11 | excel. | excel. | excel. | fair | good |
| 12 | excel. | excel. | good | fair | fair |
| 13* | — | — | — | — | — |
| 14 | excel. | excel. | fair | good | good |

Note
[1] Sodium salt of carboxymethylcellulose as in Table 3
[2] Ammonium salt of carboxymethylcellulose as in Table 3
[3] N-methylol acrylamide as in Table 3
[4] Total of sodium salt and ammonium salt of carboxymethylcellulose
[5] Polyacrylic acid as in Table 3
[6] As in Table 3
*Gelation takes place.

The present invention has been described by Examples, but it should be noted that any modifications are possible unless they deviate from the scope of the present invention defined by the claims attached hereto.

What is claimed is:

1. An aluminum member provided with a hydrophilic coating comprising, on a solid basis, 5-25 parts by weight of a sodium salt and/or a potassium salt of a carboxymethylcellulose, 25-50 parts by weight of an ammonium salt of carboxymethylcellulose, and 25-70 parts by weight of N-methylol acrylamide.

2. The aluminum member according to claim 1, wherein said hydrophilic coating is formed on said aluminum member via a chemical treatment layer and/or a resin primer layer.

3. An aluminum member provided with a hydrophilic coating comprising, on a solid basis, 5-25 parts by weight of a sodium salt and/or a potassium salt of carboxymethylcellulose, 25-50 parts by weight of an ammonium salt of carboxymethylcellulose, 25-70 parts by weight of N-methylol acrylamide, and further, per 100 parts by weight of (said sodium salt and/or said potassium salt of carboxymethylcellulose+said ammonium salt of carboxymethylcellulose+said N-methylol acrylamide), 1.5-15 parts by weight of polyacrylic acid and 0.6-9 parts by weight (as Zr) of a zirconium compound.

4. The aluminum member according to claim 3, wherein said hydrophilic coating is formed on said aluminum member via a chemical treatment layer and/or a resin primer layer.

* * * * *